(12) United States Patent
He et al.

(10) Patent No.: US 11,813,695 B2
(45) Date of Patent: Nov. 14, 2023

(54) METHOD FOR FORMING LARGE-DIAMETER SPECIAL-SHAPED CROSS SECTION THIN-WALL TUBULAR PART

(71) Applicant: DALIAN UNIVERSITY OF TECHNOLOGY, Dalian (CN)

(72) Inventors: Zhubin He, Dalian (CN); Shijian Yuan, Dalian (CN); Kailun Zheng, Dalian (CN); Wei Du, Dalian (CN); Jianshu Liu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 979 days.

(21) Appl. No.: 16/705,416

(22) Filed: Dec. 6, 2019

(65) Prior Publication Data

US 2021/0114140 A1   Apr. 22, 2021

(51) Int. Cl.
*B23K 26/24* (2014.01)
*B23K 20/12* (2006.01)
*B23K 37/00* (2006.01)
*B23K 101/18* (2006.01)

(52) U.S. Cl.
CPC ............ *B23K 26/24* (2013.01); *B23K 20/122* (2013.01); *B23K 37/003* (2013.01); *B23K 2101/185* (2018.08)

(58) Field of Classification Search
CPC ........ B23K 26/24; B23K 26/26; B23K 26/28; B23K 26/282; B23K 20/122; B23K 37/003; B23K 2101/06; B23K 2101/10; B23K 2102/185; B23K 9/025; B23K 9/0253; B23K 9/028; B23K 9/0282; B23K 9/0288
USPC ..................... 219/121.64, 121.63, 60.2, 59.1
See application file for complete search history.

(56) References Cited

U.S. PATENT DOCUMENTS

2019/0262887 A1 *  8/2019  Hirami .................. B23K 9/007
2020/0200296 A1 *  6/2020  Moon ..................... F16L 9/006
2020/0338619 A1 * 10/2020  Yuan ........................ G01B 5/02

FOREIGN PATENT DOCUMENTS

KR       20110011086 A   *  2/2011
KR        101116633 B1   *  3/2012
WO    WO-2010040642 A1   *  4/2010   ........... B21D 26/033

* cited by examiner

*Primary Examiner* — Tu B Hoang
*Assistant Examiner* — Alba T Rosario-Aponte
(74) *Attorney, Agent, or Firm* — AVEK IP, LLC

(57) ABSTRACT

A method for forming a large-diameter special-shaped cross section thin-wall tubular part. A tailor welded barrel blank is adopted as an original blank for forming of the large-diameter special-shaped cross section thin-wall tubular part. After a desired shape is formed, the original weld joint is removed and butt joint tailor welding is performed on the tubular part again. Since the tailor weld joint of the original barrel blank is removed from the final part, there is no need to consider the consistency or coordination of the microstructure of the weld joint and the base metal during the forming process and the subsequent thermal treatment process.

5 Claims, 7 Drawing Sheets

METHOD FOR FORMING LARGE-DIAMETER SPECIAL-SHAPED CROSS SECTION THIN-WALL TUBULAR PART

CROSS REFERENCE TO RELATED APPLICATIONS

This application claims priority to Chinese application number 201910998855.0, filed on Oct. 21, 2019, the disclosure of which is incorporated by reference herein in its entirety.

FIELD OF THE DISCLOSURE

The disclosure relates generally to the field of thin-wall tubular part forming. More specifically, the disclosure relates to the field of forming a large-diameter special-shaped cross section thin-wall tubular part.

BACKGROUND

In the aerospace industry, there is a class of closed members with large diameters, ultra-thin wall thickness, and complex cross-section and axis changes, such as an air intake duct and an exhaust air duct of an aircraft, a fuel storage box tunnel pipe of a rocket or missile, and the like. Such closed members are also often referred to as complex integral thin-wall tubular parts and are often made of lightweight, high-strength aluminum alloys, titanium alloys, and the like. In order to meet the harsh service performance, such complex integral thin-wall tubular parts are required to have high shape and dimension accuracy, reasonable wall thickness distribution, stable and consistent microstructure, and the like.

For the aluminum alloy, when the equivalent diameter of the tubular part is less than 300 mm and the cross-sectional shape and dimension and the axis are relatively simple, a final part can be directly formed by a seamless pipe blank obtained by extrusion or spinning. When the equivalent diameter of the tubular part is greater than 300 mm, or the cross section and axis of the tubular part are complex and variable, and the wall thickness uniformity or distribution is strictly required, a final part cannot be directly formed by adopting a seamless aluminum alloy pipe blank. At this time, the desired special-shaped pipe blank must be prepared by bending and welding. For the titanium alloy, because a large-diameter thin-wall seamless pipe cannot be prepared by existing methods, it is necessary to prepare the pipe blank by bending and welding.

Because the aluminum alloy, the titanium alloy and other materials have poor deformability at room temperature, cracking occurs quickly when the local deformation is large, so it is impossible to form complex integral thin-wall tubular parts made of the aluminum alloy and the titanium alloy at normal temperature. In order to improve the formability of the materials, it is necessary to heat the aluminum alloy and titanium alloy blanks to a specific temperature before forming. At this time, a usual process flow includes: (1) preparation of a pipe blank; (2) preforming; (3) hot forming; and (4) thermal treatment. The prepared pipe blank may be in the form of a simple cylinder or a specific conical barrel. Preforming is mainly to pre-deform an initial simple cylindrical pipe blank to achieve a desired cross-sectional shape and axis, and during this process, the perimeter of the pipe blank cross section has a small change or is substantially unchanged. Hot forming is usually to utilize, after the pipe blank is heated to a required temperature, the interaction of high pressure gas inside the pipe blank and a pipe end constraint or load to further deform the pipe blank and make the pipe blank fit a die cavity. The thermal treatment is to perform necessary thermal treatment on a whole or a part of a formed tubular part to control a microstructure and mechanical properties of a final tubular part.

When the large-sized pipe blank used is a slitted pipe blank prepared by plate bending and butt joint tailor welding, one or more of the following problems occur during the forming process. (1) In a thermal state, the deformation resistance of a tailor weld joint and an adjacent base metal is significantly reduced; when the stress intensity of a weld joint area is higher than that of an adjacent base metal area, or when the deformation resistance of the weld joint area is lower than that of the adjacent base metal, or when the wall thickness of the weld joint area is significantly smaller than that of the adjacent base metal, the weld joint area becomes a "weak area" and undergoes concentrated deformation, and eventually a part cannot be formed smoothly due to cracking. (2) Even if the weld joint area does not crack in the forming process, a microstructure of the weld joint area may also undergo adverse transformation, and the microstructure of the weld joint area cannot be effectively regulated during the subsequent thermal treatment. (3) In the subsequent thermal treatment process, in order to balance the structure properties of the weld joint area and the base metal area, a complex partition thermal treatment method may be required. For large-sized complex thin-wall tubular parts, the use of partitioned or local thermal treatment easily leads to severe shape distortion or uneven and uncontrollable structure properties due to unreasonable thermal expansion and contraction and unreasonable temperature distribution. Because of the foregoing reasons in several aspects, currently the hot forming of the large-diameter complex thin-wall members has become a problem in the field of forming and manufacturing.

Therefore, how to change the current situation (i.e., the weld joint area easily deforms and cracks during the manufacturing process of the large-diameter special-shaped cross section thin-wall tubular part, the microstructure of the weld joint area is abnormal, and local or partitioned thermal treatment easily causes part distortion) has become a problem which needs to be solved by those skilled in the art.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a method for forming a large-diameter special-shaped cross section thin-wall tubular part including the following steps.

Step 1. Performing feature analysis on a target part, determining a shape of a prefabricated barrel blank, and determining requirements for a position and dimension of a tailor weld joint on the prefabricated barrel blank.

Step 2. Cutting a plate blank and rolling the plate blank into a barrel shape.

Step 3. Tailor-welding the plate blank rolled in step 2 into a barrel blank where a radial cross section of the barrel blank is closed.

Step 4. Pre-deforming the barrel blank obtained in step 3.

Step 5. Performing hot air pressure bulging on the pre-deformed barrel blank so that the barrel blank bulges and deforms and abuts against a die cavity, thereby obtaining a tubular part with a contour required for the target part.

Step 6. Performing thermal treatment on the tubular part obtained in step 5 so that structure properties of a base metal area of the tubular part meet design requirements.

Step 7. Removing the tailor weld joint on the thermally-treated tubular part.

Step 8. Performing butt joint tailor welding on the tubular part after the removal of the original tailor weld joint.

Step 9. Correcting and polishing the tubular part obtained by butt joint tailor welding to finally obtain the target part.

Optionally, in step 1, the tailor weld joint is a straight weld joint parallel to an axial direction of the barrel blank when the determined prefabricated barrel blank is a cylindrical barrel blank with an equal cross section. The tailor weld joint is a straight weld joint in the same plane as the axis of the barrel blank when the determined prefabricated barrel blank is a conical barrel blank with an unequal cross section. And the tailor weld joint is a two-dimensional curve weld joint when the determined prefabricated barrel blank is a barrel blank having a non-circular cross section.

Optionally, in step 4, the barrel blank is pre-deformed so that a cross-sectional shape of a whole or local area of the barrel blank is changed.

Optionally, in step 5, a compressed gas with a pressure of 10-50 MPa is introduced into the tailor welded barrel blank so that the barrel blank is bulged within a time period of 30-100 s and abuts against the die cavity to obtain a contour required for the target part.

Optionally, the compressed gas introduced into the tailor welded barrel blank is compressed air or compressed nitrogen.

Optionally, in step 7, the original weld joint on the thermally-treated tubular part is removed by a laser cutting machine or a water cutting machine.

Optionally, a width of a removed portion of the tubular part is 1-2 mm wider than that of a weld nugget zone of the original weld joint, and a cut weld joint area is cooled by liquid nitrogen or cold air to ensure that the temperature of the weld joint area is below 100° C.

Optionally, in step 8, butt joint tailor welding of the tubular part is achieved by friction stir welding.

Optionally, in step 9, the tubular part subjected to butt joint tailor welding is placed in a hot air pressure bulging die, and the tubular part is integrally corrected or locally corrected by normal temperature hydraulic bulging or air pressure bulging.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with references to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
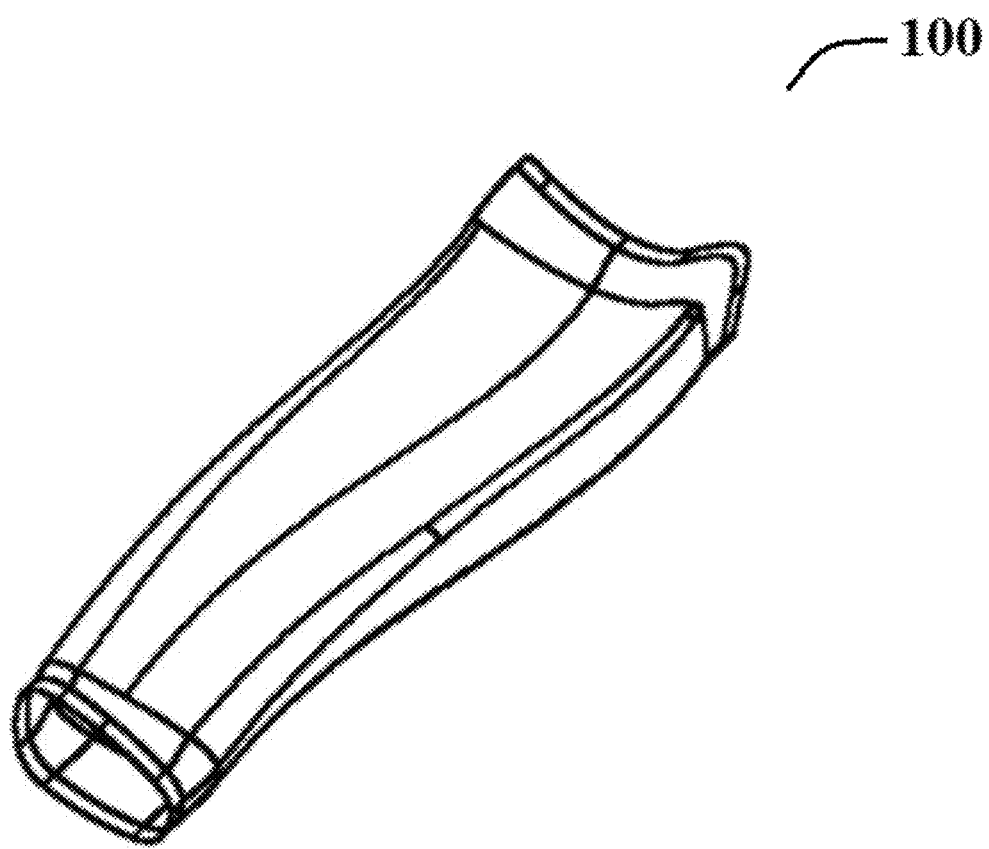
FIG. 1 is a schematic view of a target part example 100.
Figure 2:
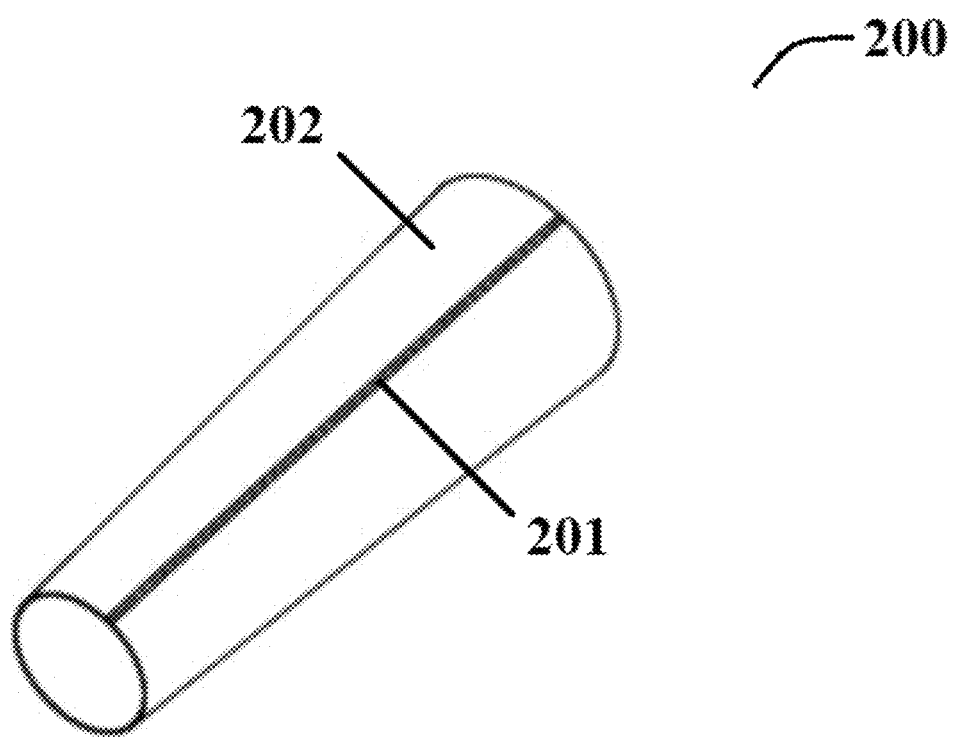
FIG. 2 is a schematic view of a barrel blank example 200 obtained by step 2 and step 3.
Figure 3:
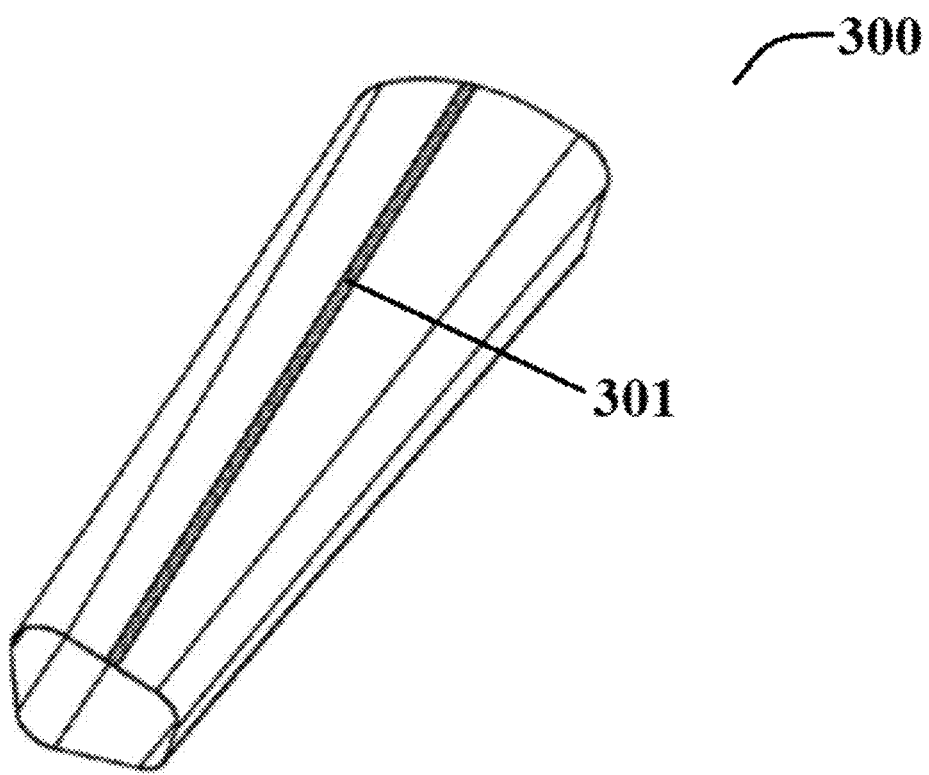
FIG. 3 is a schematic view of a pre-deformed barrel blank example 300 obtained by step 4.
Figure 4:
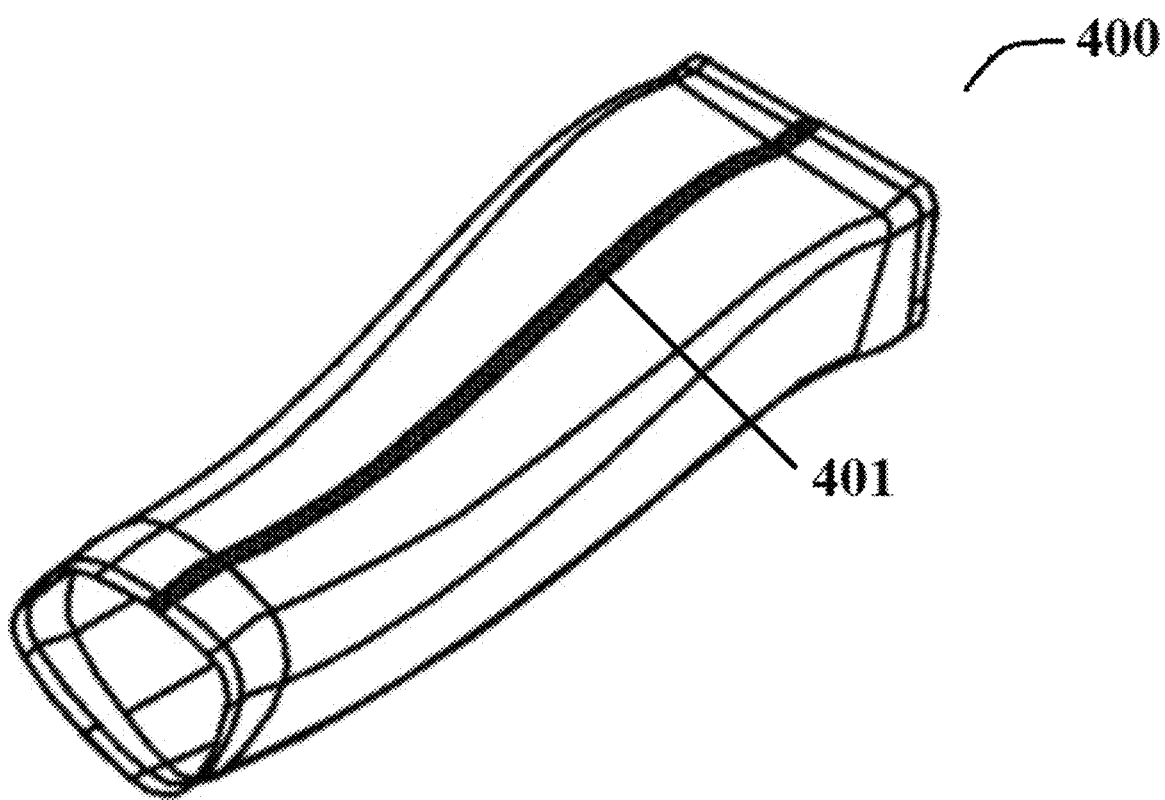
FIG. 4 is a schematic view of a tubular part example 400 obtained by step 5 with a contour of the target part 100.
Figure 5:
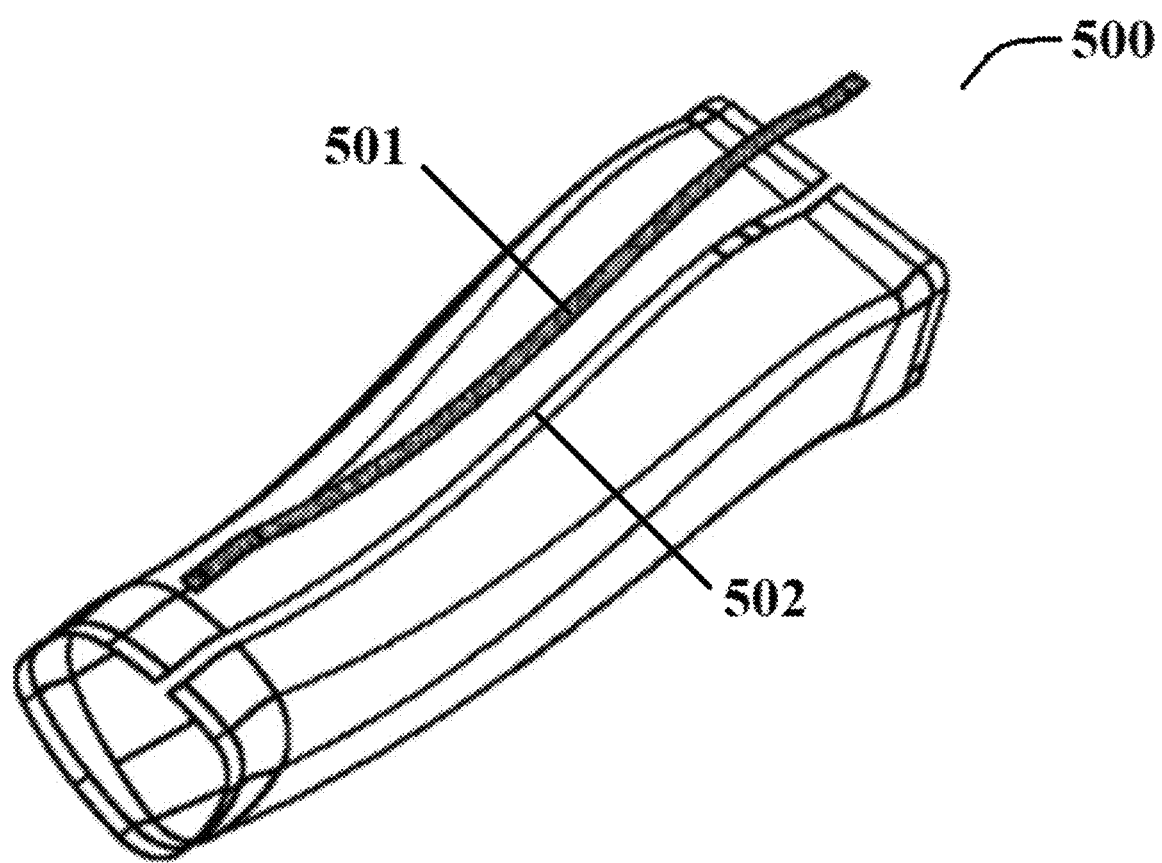
FIG. 5 is a schematic view of a thermally-treated tubular part 500 obtained by step 7.
Figure 6:
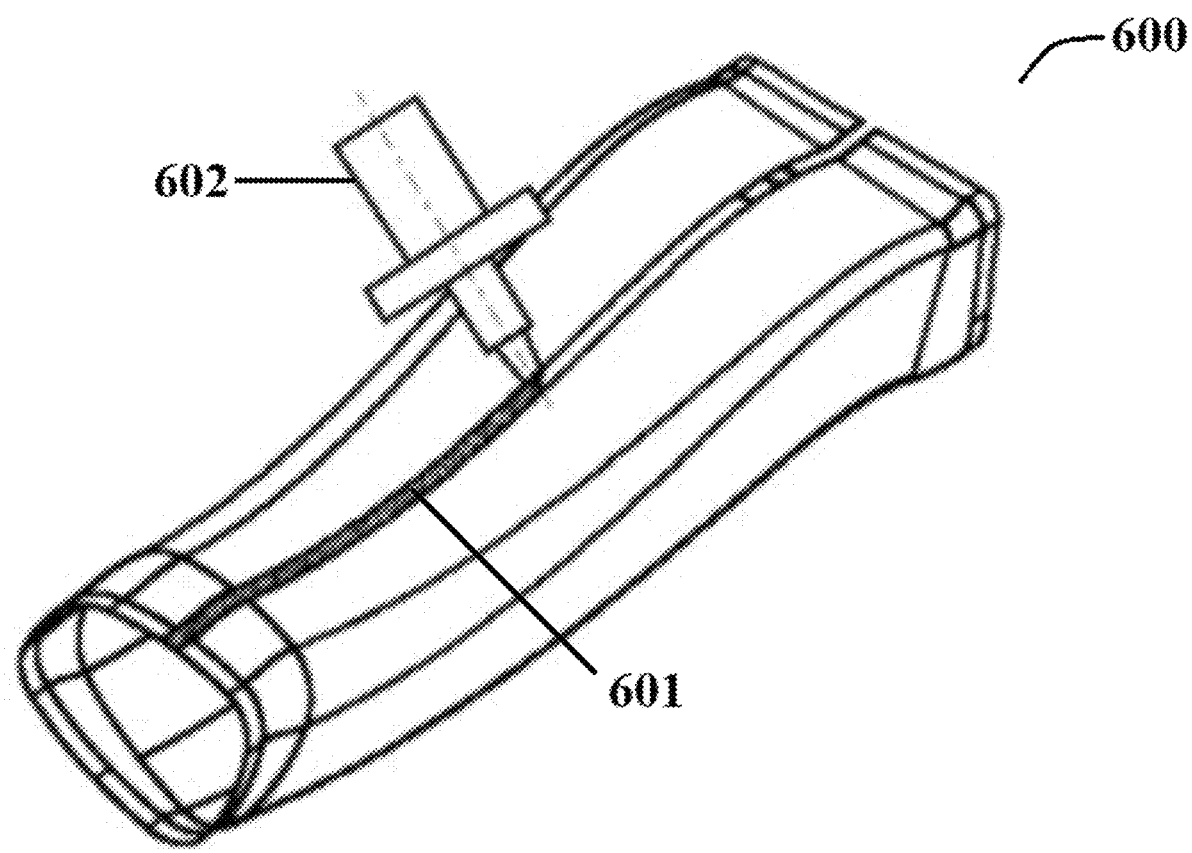
FIG. 6 is a schematic view of a tubular part example 600 obtained by step 8.
Figure 7:
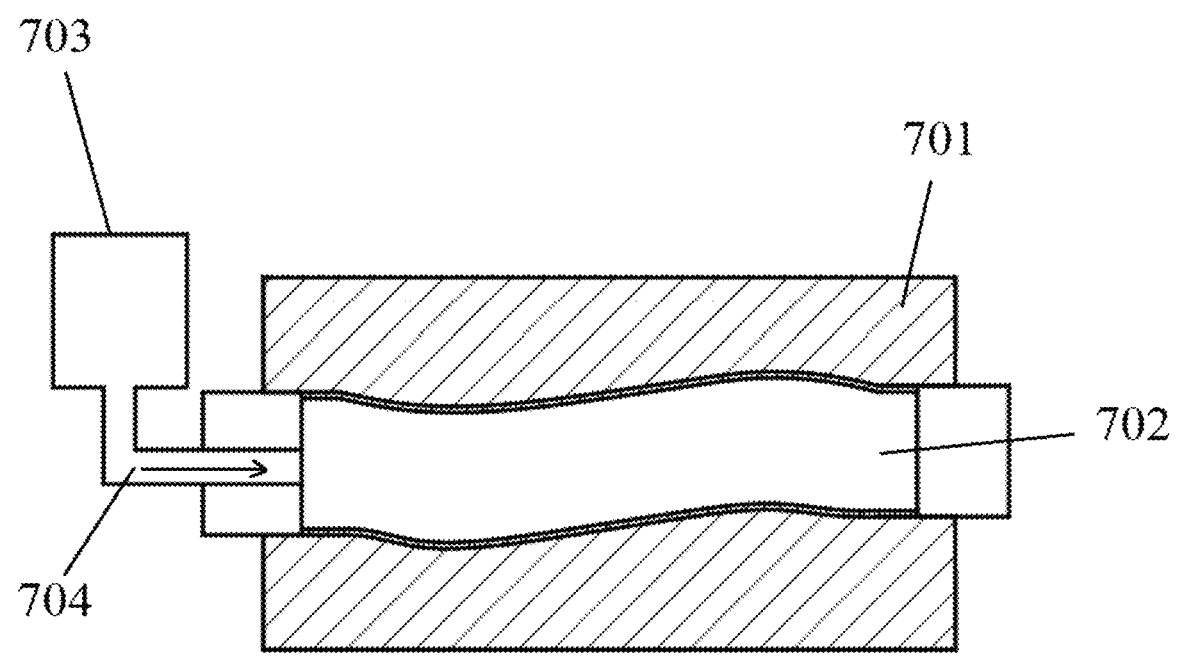
FIG. 7 is a cross-sectional view of the barrel blank in a die cavity of a hot air pressure bulging die.

Referring to FIGS. 1-5, FIG. 1 shows a schematic view of a target part example 100 of a method for forming a large-diameter special-shaped cross section thin-wall tubular part. FIG. 2 shows a schematic view of a barrel blank example 200 of a method for forming a large-diameter special-shaped cross section thin-wall tubular part obtained by step 2 and step 3. FIG. 3 shows a schematic view of a pre-deformed barrel blank example 300 of a method for forming a large-diameter special-shaped cross section thin-wall tubular part obtained by step 4. FIG. 4 shows a schematic view of a tubular part example 400 of a method for forming a large-diameter special-shaped cross section thin-wall tubular part obtained by step 5 with a contour of the target part 100. FIG. 5 shows a schematic view of a thermally-treated tubular part 500 of a method for forming a large-diameter special-shaped cross section thin-wall tubular part obtained by step 7. FIG. 6 shows a schematic view of a tubular part example 600 of a method for forming a large-diameter special-shaped cross section thin-wall tubular part obtained by step 8. In FIG. 6, 602 represents a stirring head of a friction stir welding device.

In some embodiments, the disclosure provides a method for forming a large-diameter special-shaped cross section thin-wall tubular part, including the following steps.

Step 1. Performing feature analysis on a target part 100. Determining the shape of a prefabricated barrel blank, which may be thermally-treated tubular part 500, by theoretical calculation or simulation analysis and the like. And determining requirements for a position and dimension of a tailor weld joint on the prefabricated barrel blank.

Step 2. Cutting a plate blank 202 and rolling the plate blank into a barrel shape.

Step 3. Tailor-welding the plate blank rolled in step 2 into a barrel blank 200. A radial cross section of the barrel blank 200 has a closed shape. Since the original weld joint (201 after step 3, 301 after step 4, 401 after step 5, and 501 after step 7) is removed from the final target part, which is the tubular part 600 in this example, the requirements for the structure, properties, shapes, and the like of the tailor weld joint may be reduced. It is only necessary to ensure that the tailor weld joint is not damaged in the subsequent pre-deformation process in step 4 and hot air bulging process in step 5, and the obtaining of the target part that meets the shape and dimension requirements is not affected. Now, the tailor welding in step 3 is only for welding the rolled barrel blank 200 together, and it is only necessary to ensure that there is no air leakage when the inside of the blank is filled with gas for bulging and to ensure that the tailor weld joint 201 and peripheral base metal may undergo relatively coordinated deformation in step 4. Therefore, there are no strict restrictions on welding method selection, weld joint structure design, and welding process parameter determination and the like, which may reduce the difficulty of barrel blank tailor welding.

Step 4. Pre-deforming the barrel blank 200 obtained in step 3 to obtain a pre-deformed barrel blank 300.

Step 5. Performing hot air pressure bulging on the pre-deformed barrel blank 300 so that the barrel blank 300 bulges and deforms and abuts against a die cavity 702, thereby obtaining a tubular part 400 with a contour required for the target part 100. Similar to step 3, since the original weld joint (201 after step 3, 301 after step 4, 401 after step 5, and 501 after step 7) will be removed from the target part, there is no need to simultaneously consider the microstructure of the weld joint area and the base metal area during the hot air bulging process in step 5. Further, there is no need to strictly ensure the deformation flow coordination of the weld joint and the base metal, as long as it may be ensured that a required shape and dimension may be acquired for the base metal area after the forming. Therefore, the hot air bulging difficulty may be reduced, and the adoption of a complicated die tool may be avoided.

Step 6. Performing thermal treatment on the tubular part 400 obtained in step 5 to produce a thermally-treated tubular part 500 so that structure properties of a base metal area of the tubular part meet design requirements. Since there is no need to consider the tailor weld joint and the base metal simultaneously, it is only necessary to ensure the microstructure and mechanical properties of the base metal area. Therefore, the thermal treatment requirements may be lowered, and complicated partitioned thermal treatment may be avoided. It is now only necessary to pay attention to thermal treatment requirements of the base metal, and the selection range of thermal treatment process parameters is broadened.

Step 7. Removing the tailor weld joint 501 from the thermally-treated tubular part 500. After the removal of the tailor weld joint 501, the thermally treated part 500 has a slit area 502.

Step 8. Performing butt joint tailor welding on the thermally-treated tubular part 500 after the removal of the original tailor weld joint 501. The final target part, which is the tubular part 600 with a new tailor weld joint 601 in this example, may be obtained after the welding is completed, and it may be ensured that the final microstructure of the final target part is uniform and reliable.

Step 9. Correcting and polishing the tubular part 600, which is the final target part in this example, obtained by butt joint tailor welding to finally obtain the target part. The forming quality of the target part may be improved.

In other embodiments, a tailor welded barrel blank is adopted as an original blank for forming of the large-diameter special-shaped cross section thin-wall tubular part. After a desired shape is formed, the original weld joint is removed and butt joint tailor welding is performed on the tubular part again. Since the tailor weld joint of the original barrel blank is removed from the final part, the tailor welding of the initial barrel blank and the tailor welding of the final part may be performed separately. In other words, different welding methods or welding structures or welding parameters may be used, and it is only necessary to ensure that the tailor weld joint area does not crack in the forming process. There is no need to consider the consistency or coordination of the microstructure of the weld joint and the base metal during the forming process and the subsequent thermal treatment process, which may help to avoid the difficulty in ensuring the coordination between the weld joint and the base metal in the conventional forming process and the thermal treatment process.

Optionally, in step 1, the tailor weld joint is a straight weld joint parallel to an axial direction of the barrel blank when the determined prefabricated barrel blank is a cylindrical barrel blank with an equal cross section. The blanking of the plate blank may be directly achieved by a plate shearing machine, the rolling of the plate blank may be carried out by a universal rolling machine, and the weld joint welding is simple and easy to operate when the cylindrical barrel blank with the equal cross section is adopted. And the shape and size of each cross section in the axial direction of the barrel blank gradually change monotonically or non-monotonically when the determined prefabricated barrel blank is a conical barrel blank with an unequal cross section or a barrel blank having a non-circular cross section. In step 2, the conical barrel blank with an unequal cross section or a barrel blank having a non-circular cross section is adopted, the tailor weld joint is a straight line along the axial direction of the barrel blank or a curve of a two-dimensional space so that the shape and perimeter of each cross section in the axial direction of the barrel blank are correspondingly changed according to the requirements for the shape and dimension and wall thickness distribution of the final part, and the part with large changes in the cross-sectional shape and large changes in the perimeter of each cross section are obtained. At the same time, the difficulty of the subsequent preforming and hot air pressure bulging process may be simplified, the requirements for a forming device and a die tool may be lowered, and the development cycle and manufacturing cost of complicated parts may be reduced.

Optionally, in step 4, the barrel blank is pre-deformed so that a cross-sectional shape of a whole or local area of the barrel blank is changed. By pre-deforming the barrel blank obtained by tailor welding, it is possible to avoid macroscopic defects such as undercut and folding resulting from abnormal cross-sectional changes of the barrel blank during a die assembly stage of hot air pressure bulging. At the same time, by pre-deforming the barrel blank, a blank closer to a subsequent hot air pressure bulging die cavity may be obtained so that the distance between each position of the blank and the die cavity is the same or similar. The deformation of the local area of the hot air pressure bulging stage may be reduced, making it easier to obtain the final target part with a wall thickness meeting the design requirements.

Optionally, in step 5, a compressed gas 704 with a pressure of 10-50 MPa is quickly introduced into the tailor welded barrel blank from a gas source 703 so that the barrel blank is bulged within a time period of 30-100 s and abuts against the die cavity to obtain a contour required for the target part. By carrying out the bulging of the barrel blank with high pressure gas, the forming of the barrel blank may be completed in a short time. Therefore, the weld joint and the base metal may have a short retention time under high temperature conditions, which may reduce weld joint cracking and the like resulting from complicated changes in the microstructure of the weld joint area at a high temperature, thereby ensuring that the hot air pressure forming of the barrel blank is successfully completed. In order to effectively protect the barrel blank, the compressed gas introduced into the tailor welded barrel blank may be compressed air or compressed nitrogen.

Taking the material of the prepared barrel blank, 2A12 aluminum alloy, as an example, in step 6, the tubular part obtained by hot air pressure bulging is subjected to integral thermal treatment. The integral thermal treatment conditions are: a solution temperature of 510-540° C., a time of 3.0-4.5 h, cooling by water quenching, an aging temperature of 180-210° C., and a time of 1.5-2.5 h. In some prior art, in order to take account of the structure properties of the weld joint and the base metal, the adopted thermal treatment conditions are: a solution temperature of 520-535° C., a time of 3.0-3.5 h, cooling by water quenching with a quenching liquid, an aging temperature of 185±5° C., and a time of 1.5 h. The structure property regulation of the formed tubular part is performed in an integral thermal treatment mode. Established thermal treatment specifications and conditions only need to meet the requirements for thermal treatment of the base metal area. Without considering the change of the structure property of the weld joint area, the thermal treatment process parameter selection range may be wide. Therefore, the problems of complicated tools and difficulty in operation and the like resulting from partitioned thermal treatment needing to be adopted to consider the weld joint and the base metal may be solved.

Further, in step 7, the original weld joint on the thermally-treated tubular part is removed by a laser cutting machine or a water cutting machine, which may ensure that cuts on the cut tubular part are smooth and free of burrs, which may be beneficial to the subsequent tubular part tailor welding. By combining a cutting device and a numerically-controlled machine tool, precise cutting may be performed according to a set movement path so that complex two-dimensional curve weld joint cutting may be achieved.

In order to ensure that the original weld joint is completely removed, a width of a removed portion of the tubular part is 1-2 mm wider than that of a weld nugget zone of the original weld joint, which may prevent the original weld joint from affecting the properties of the final target part. Then, a cut weld joint area is cooled by liquid nitrogen or cold air to ensure that the temperature of the weld joint area is below 100° C., and the cut area is timely cooled during cutting, which may help to avoid the adverse effect of the local quick temperature rise in the cutting process on the structure properties.

Further, in step 8, butt joint tailor welding of the tubular part is achieved by friction stir welding. For the tubular parts with the weld joint being a straight line, a conventional internal supporting friction stir welding method is adopted. For the weld joint of a two-dimensional curve, a novel self-supporting friction stir welding method is adopted. The friction stir welding is solid state welding. The material does not have a fusion and complex solidification process in the welding process. The welding process has a small influence on an area adjacent to the weld joint, the weld joint uniformity is good, and grains are fine and high in strength. The strength of the weld joint area may reach 85-90% that of the thermally-treated base metal, thereby ensuring that the tubular part has good service performance after butt joint tailor welding.

To further ensure the forming quality of the target part, in step 9, the tubular part subjected to butt joint tailor welding is placed in a hot air pressure bulging die 701, and the tubular part is integrally corrected or locally corrected by normal temperature hydraulic bulging or air pressure bulging.

In further embodiments, a tailor welded barrel blank is adopted as an original blank for forming of the large-diameter special-shaped cross section thin-wall tubular part. After a desired shape is formed, the original weld joint is removed and butt joint tailor welding is performed on the tubular part again. Since the tailor weld joint of the original barrel blank is removed from the final part, there is no need to consider the consistency or coordination of the microstructure of the weld joint and the base metal during the forming process and the subsequent thermal treatment process, which may help to avoid the difficulty in ensuring the coordination between the weld joint and the base metal in the conventional forming process and the thermal treatment process. This may help to solve the problems that the weld joint area easily deforms and cracks, the microstructure of the weld joint area is abnormal, and local or partitioned thermal treatment easily causes part distortion.

In some embodiments, the disclosure provides a method for forming a large-diameter special-shaped cross section thin-wall tubular part including the following steps. (1) Performing feature analysis on a target part, determining a shape of a prefabricated barrel blank, and determining requirements for a position and dimension of a tailor weld joint on the prefabricated barrel blank. (2) Cutting a plate blank and rolling the plate blank into a barrel shape. (3) Tailor welding the plate blank rolled in step (2) into a barrel blank, where a radial cross section of the barrel blank is closed. (4) Pre-deforming the barrel blank obtained in step (3). (5) Performing hot air pressure bulging on the pre-deformed barrel blank so that the barrel blank bulges and deforms and abuts against a die cavity, thereby obtaining a tubular part with a contour required for the target part. (6) performing thermal treatment on the tubular part obtained in step (5) so that structure properties of a base metal area of the tubular part meet design requirements. (7) Removing the tailor weld joint on the thermally-treated tubular part. (8) Performing butt joint tailor welding on the tubular part after the removal of the original tailor weld joint. (9) Correcting and polishing the tubular part obtained by butt joint tailor welding to finally obtain the target part.

In other embodiments, a tailor welded barrel blank is adopted as an original blank for forming of the large-diameter special-shaped cross section thin-wall tubular part. After a desired shape is formed, the original weld joint is removed and butt joint tailor welding is performed on the tubular part again.

Various embodiments of the disclosure may have one or more of the following effects. The disclosure may provide a method for forming a large-diameter special-shaped cross section thin-wall tubular part, which may avoid deformation and cracking of weld joints and overcome the difficulty in coordination of the weld joint and a base metal in the thermal treatment process. The disclosure may further avoid the difficulty in ensuring the coordination between the weld joint and the base metal in the conventional forming process and the thermal treatment process, which may help to solve the problems that the weld joint area easily deforms and cracks, the microstructure of the weld joint area is abnormal and local or partitioned thermal treatment easily causes part distortion. In some embodiments, since the tailor weld joint of the original barrel blank is removed from the final part, there is no need to consider the consistency or coordination of the microstructure of the weld joint and the base metal during the forming process and the subsequent thermal treatment process, which may help to avoid the difficulty in ensuring the coordination between the weld joint and the base metal in the conventional forming process and the thermal treatment process. This may help to solve the problems that the weld joint area easily deforms and cracks, the microstructure of the weld joint area is abnormal, and local or partitioned thermal treatment easily causes part distortion.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A method for forming a large-diameter special-shaped cross section thin-wall tubular part, comprising the steps of:
    (1) performing feature analysis on a target part by determining a shape of a prefabricated barrel blank, and determining a position and dimension of a tailor weld joint on the prefabricated barrel blank, thereby forming a target part;
    (2) cutting a plate blank and rolling the plate blank into a barrel shape;
    (3) tailor welding the plate blank rolled in step (2) into a barrel blank, wherein a radial cross section of the barrel blank is closed;
    (4) pre-deforming the barrel blank obtained in step (3);
    (5) performing hot air pressure bulging on a pre-deformed barrel blank obtained in step (3) so that the pre-deformed barrel blank bulges and deforms and abuts against a die cavity, thereby obtaining a tubular part with a contour required for the target part;
    (6) performing thermal treatment on the tubular part obtained in step (5);
    (7) removing the tailor weld joint by laser cutting on a thermally-treated tubular part obtained in step (6);
    (8) performing butt joint tailor welding on the thermally-treated tubular part after the removal of the tailor weld joint; and
    (9) correcting and polishing the tubular part obtained by butt joint tailor welding to finally obtain the target part;
    wherein in step (5), a compressed gas with a pressure of 10-50 MPa is introduced into a tailor welded barrel blank so that the barrel blank is bulged within a time period of 30-100 s and abuts against the die cavity to obtain a contour required for the target part;
    wherein in step (6), the thermal treatment conditions are: a solution temperature of 510-540° C., a time of 3.0-4.5 h, cooling by water quenching, an aging temperature of 180-210° C., and a time of 1.5-2.5 h; and
    wherein in step (7), a width of a removed portion of the tubular part is 1-2 mm wider than that of a weld nugget zone of the tailor weld joint; and a cut weld joint area is cooled by liquid nitrogen or cold air to ensure a temperature of a weld joint area is below 100° C.

2. The method for forming the large-diameter special-shaped cross section thin-wall tubular part according to claim 1, wherein in step (4), the barrel blank is pre-deformed so that a cross-sectional shape of a whole or local area of the barrel blank is changed.

3. The method for forming the large-diameter special-shaped cross section thin-wall tubular part according to claim 1, wherein the compressed gas introduced into the tailor welded barrel blank is compressed air or compressed nitrogen.

4. The method for forming the large-diameter special-shaped cross section thin-wall tubular part according to claim 1, wherein in step (8), butt joint tailor welding of the tubular part is achieved by friction stir welding.

5. The method for forming the large-diameter special-shaped cross section thin-wall tubular part according to claim 1, wherein in step (9):
    the tubular part subjected to butt joint tailor welding is placed in a hot air pressure bulging die; and
    the tubular part is integrally corrected or locally corrected by normal temperature hydraulic bulging or air pressure bulging.

* * * * *